(12) United States Patent
Terpay

(10) Patent No.: US 6,863,239 B2
(45) Date of Patent: Mar. 8, 2005

(54) FLUID CONDUIT FOR USE WITH HYDRAULIC ACTUATOR

(75) Inventor: Gregory W. Terpay, Whippany, NJ (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 0 days.

(21) Appl. No.: 10/248,885

(22) Filed: Feb. 27, 2003

(65) Prior Publication Data

US 2004/0169108 A1 Sep. 2, 2004

(51) Int. Cl.[7] .............................................. B64C 27/00
(52) U.S. Cl. ............................. 244/17.11; 244/17.27; 244/60; 414/918; 901/28
(58) Field of Search .................... 414/918; 901/28; 244/17.11, 17.27, 60; 138/177, 178, 109, 122, 129; 416/23, 24

(56) References Cited

U.S. PATENT DOCUMENTS

| | | | | |
|---|---|---|---|---|
| 1,990,814 A | | 2/1935 | Castro ........................ 170/163 |
| 2,274,334 A | | 2/1942 | Keller ........................ 170/163 |
| 2,282,297 A | | 5/1942 | Keller ........................ 170/163 |
| 2,428,308 A | | 9/1947 | Day ........................... 170/163 |
| 2,433,990 A | | 1/1948 | Hardy ........................ 170/163 |
| 2,498,109 A | | 2/1950 | Lathrem ................... 170/160.32 |
| 2,501,617 A | | 3/1950 | Roesch ................... 170/160.31 |
| 2,525,260 A | | 10/1950 | Geyer ................... 170/135.27 |
| 2,533,415 A | | 12/1950 | Anderson ............... 170/160.33 |
| 2,623,601 A | | 12/1952 | Frankland ............... 170/160.33 |
| 2,635,702 A | | 4/1953 | Anderson ............... 170/160.33 |
| 2,653,671 A | | 9/1953 | Martin et al. .......... 170/160.33 |
| 2,703,148 A | | 3/1955 | Pearl ....................... 170/160.32 |
| RE26,461 E | | 9/1968 | Barnes et al. ........... 170/160.32 |
| 3,402,743 A | * | 9/1968 | Brueder ........................ 138/178 |
| 3,632,140 A | * | 1/1972 | Paine et al. ................... 138/178 |
| 3,924,404 A | | 12/1975 | Pollert ........................... 60/226 |
| 4,080,098 A | | 3/1978 | Watson ......................... 416/103 |
| 4,137,948 A | * | 2/1979 | Van Heijst |
| 4,178,130 A | | 12/1979 | Ferris et al. ................. 416/107 |
| 4,229,141 A | | 10/1980 | de Francisco Mesado .. 416/157 |
| 4,387,866 A | | 6/1983 | Eickmann ........................ 244/7 |
| 4,534,704 A | | 8/1985 | McArdle ....................... 416/158 |
| 4,555,219 A | | 11/1985 | Jeffery et al. ................ 416/158 |
| 4,643,643 A | | 2/1987 | Otto ............................. 416/154 |
| 4,749,335 A | | 6/1988 | Brandt et al. ................ 416/157 |
| 5,030,149 A | | 7/1991 | Fujita ............................ 440/75 |
| 5,213,471 A | | 5/1993 | Miller et al. ................... 416/44 |
| 6,050,778 A | | 4/2000 | McArdle et al. ............. 416/107 |
| 6,098,666 A | * | 8/2000 | Wells et al. |
| 6,189,403 B1 | * | 2/2001 | Berninger .................... 414/918 |
| 6,200,096 B1 | * | 3/2001 | Kohlhepp ...................... 416/24 |
| 6,247,763 B1 | * | 6/2001 | Rehn et al. |
| 6,295,006 B1 | * | 9/2001 | Kohlhepp ................. 244/17.11 |
| 6,354,536 B1 | * | 3/2002 | Torok et al. ................... 416/24 |

* cited by examiner

*Primary Examiner*—Michael J. Carone
*Assistant Examiner*—Lulit Semunegus
(74) *Attorney, Agent, or Firm*—Howrey Simon Arnold & White, LLP

(57) ABSTRACT

A fluid conduit is provided for use in a hydraulic actuating system for controlling an instrumentality disposed on a rotating portion of a machine. The fluid conduit transports pressurized fluid between a fluid source disposed on a non-rotating portion of the machine and the instrumentality and comprises a rigid tubular member formed in the shape of a helix having at least about 2 revolutions and a non-constant pitch length. The ends of the tube are adapted to be sealingly connected between the fluid source and the instrumentality. The fluid conduit is used, for example, in an apparatus and system for controlling a hydraulic actuator mounted on a rotating blade.

10 Claims, 6 Drawing Sheets

FLUID CONDUIT FOR USE WITH HYDRAULIC ACTUATOR

CROSS REFERENCE TO RELATED APPLICATIONS

This application is related to co-pending U.S. patent application Ser. No. 09/634,554 entitled "Permanent Magnet Phase-Control Motor" filed Aug. 8, 2000, and U.S. Pat. No. 6,354,536 entitled Rotor Hub Mounted Actuator For Controlling A Blade On A Rotorcraft, both of which are hereby incorporated by reference in their entirety.

FEDERAL RESEARCH STATEMENT

The Government has rights to the invention pursuant to government contract N00014-96-C-2079 awarded by the United States Naval Research Laboratory.

BACKGROUND OF INVENTION

This invention relates generally to a fluid conduit, and more particularly to a flexible fluid conduit for transporting a pressurized fluid between a fluid source and an actuator mounted on, for example, an articulated portion of a machine such as a rotor blade on a rotary wing aircraft.

Fundamental to the operation of many machines, devices, or instrumentalities is the ability to control an articulated part which moves relative to the rest of the instrumentality, device or machine. For example, many turbine or fan devices have facility for dynamically controlling the pitch of their rotor blades. Pitch is a factor in determining the dynamic forces acting on the blade and, hence, determining the forces applied by the blades to the frame of the instrumentality.

Control of blade pitch generally originates in the frame of the instrumentality which is stationary relative to the articulated portion of the instrumentality. Control of the variable pitch of the blades of, for example, a wind turbine, a ship or airplane propeller, and the main rotor or the tail rotor of a helicopter are all originated within a rotating hub of the wind turbine, ship, airplane or helicopter, respectively.

In a rotary wing aircraft application, such as a helicopter, an active rotor control system can be used to reduce vibratory loads and externally radiated noise originating from the main rotor system. Actively controlled blade actuation systems control the pitch of the rotor blades or the pitch of leading or trailing edge flaps on the blades during flight. An actuator mounted on the blades is used to control the movement of the blades or flaps. While actuation requirements are dependent on the specific application and the capabilities of the control software and hardware, the actuation system must be designed to produce sufficient force to counter both aerodynamic and inertial loads while being small in size and light in weight. Further, the actuation system must be capable of providing a sufficient amount of force to overcome the air loads acting on the flap during normal flight (i.e., when the flap is being held motionless relative to the blade). In order to meet these design requirements, a hydraulic actuation system which supplies pressurized fluid to the actuators is preferred for several reasons. For example, fluid compressibility is low which provides better control over flap motion, and hydraulic actuators provide the greatest work output on a per unit volume and a per unit weight basis.

Generally, hydraulic actuation systems include a source of fluid which is remotely located from the associated actuator. The remote location of the source of fluid is what allows the actuators to be both small and light weight.

The fluid path from the actuator fluid source to the helicopter blade or flap actuator bridges a multi-degree of freedom joint which provides for rotor blade articulation in pitch, flapping, and lead/lag. The joint must be unrestrained in its movement by any fluid line linking the fluid source and actuator which bridges the joint. Additionally, the linkage which bridges the joint must not significantly add to the force required to move the rotor blade in the joint.

Ordinarily a simple flexible hose would be used to accommodate motion of the multi-degree of freedom joint. However, because the wall stiffness of the flexible hose is low (allowing the hose to be flexible to motion), the flexible hose expands in diameter with increased fluid pressure. In high performance hydraulic actuator systems, the elastic expansion and contraction of a flexible hose carrying fluid to or from the actuator consumes power which would otherwise be transmitted to the actuator. Given that there is a desire to keep the fluid source as small as possible, this power loss is undesirable. Moreover, the lapse time between a control signal commanding the fluid source to supply or remove fluid from the actuator and the actuator actually moving can be long. Thus, a flexible fluid hose can reduce the responsiveness of a hydraulic actuator system which results in reduced performance. An active hydraulic actuator system in as demanding an environment as a rotary wing aircraft cannot accommodate the compliance of a flexible hose of the length needed to bridge the flexible joint.

Metal piping, due to its rigidity, would allow an actuator system utilizing pressurized fluid to meet performance requirements. Metal pipe is robust, inexpensive, and easily changes direction via elbows or, if thin wall metal pipe is used, by bending. The diameter of metal pipe changes little with an increase in fluid pressure since the metal is a stiff-walled conduit. Unfortunately, rigid metal fluid lines are intended for stationary connections and cannot accommodate relative motion between a fluid source and an actuator associated with the articulated portion of machinery.

For the foregoing reasons, there is a need for a flexible fluid conduit for transporting a pressurized working fluid between a fluid source and an actuator. The fluid conduit should be suitable for a high performance hydraulic actuation system on articulated machines, devices, or instrumentalities, wherein the actuator is mounted on the articulated portion of the machine. The conduit should be compliant enough to bridge a multi-degree of freedom joint between the actuator fluid source and the actuator without restraining or adding to the force required to move the joint. The conduit should also have high wall stiffness to minimize power loss and lapse time in carrying fluid to or from the actuator.

SUMMARY OF INVENTION

According to the present invention, a fluid conduit is provided for use in a hydraulic actuating system for controlling an instrumentality disposed on an articulated portion of a machine. The fluid conduit transports pressurized fluid between a fluid source disposed on the machine and the instrumentality and comprises a rigid tubular member formed in the shape of a helix having at least 2 revolutions and a non-constant pitch length. The ends of the tube are adapted to be sealingly connected between the fluid source and the instrumentality.

Also according to the present invention, an apparatus is provided for use in a hydraulic actuating system including a fluid source adapted to be disposed on a non-rotating portion of a machine, a hydraulic actuator mounted on an articulated instrumentality disposed on a rotating portion of the machine, and hydraulic actuating means for transferring fluid between the fluid source and the hydraulic actuator for moving the instrumentality relative to the rotating portion of the machine. The apparatus comprises a rigid tubular member formed in the shape of a helix having at least about 2 revolutions and a non-constant pitch length. The ends of the tube adapted to be sealingly connected between the fluid source and the hydraulic actuator.

Further according to the present invention, a fluid line is provided for use in an active control device for controlling a rotor blade, or a pivoting flap on the rotor blade, of a rotary wing aircraft having an airframe and a rotor rotatable relative to the airframe. The rotor includes a hub and at least one elongated rotor blade connected at one end to the hub and extending radially outwardly from the hub such that when the rotor hub is rotatably driven the rotor blade rotates with the hub. The rotor blade is movable about a pitch axis extending along its length and about the two transverse axes. A hydraulic actuation system is provided for moving the blade or flap about the pitch axis including a fluid source, means for controlling the position of the blade or flap about the axis, and a hydraulic actuator operatively connected to the blade or flap for changing the position of the blade or flap about the axis in response to a signal from the controlling means. The fluid line comprises a rigid tubular member formed in the shape of a helix of at least 2 revolutions and a non-constant pitch length. The ends of the tube are adapted to be sealingly connected between the fluid source and the actuator for supplying pressurized fluid to the actuator.

Still further according to the present invention, an active control device is provided for hydraulically controlling the position of a movable rotor blade flap on a rotary wing aircraft having an airframe and a rotor rotatable relative to the airframe. The rotor includes a hub and at least one elongated rotor blade connected at one end to the hub and extending radially outwardly therefrom such that when the rotor hub is rotatably driven the rotor blade rotates with the hub. The active control device comprises a fluid source adapted to be mounted to the airframe, means for controlling the position of the flap about the axis, a hydraulic flap actuator adapted to be operatively connected to the flap for changing the position of the flap with respect to the blade in response to a signal from the controlling means, and a rigid tubular member formed in the shape of a helix having at least about 2 revolutions and a non-constant pitch length. The ends of the tubular member are sealingly connected between the fluid source and the hydraulic flap actuator for transferring pressurized fluid between the fluid source and the flap actuator.

Yet further according to the present invention, a rotary wing aircraft comprises an airframe, a rotor rotatable relative to the airframe and including a hub, and at least one elongated rotor blade connected at one end to the hub and extending radially outwardly therefrom such that when the rotor hub is rotatably driven the rotor blade rotates with the hub. The rotor blade comprises a flap attached to and movable relative to the blade about an axis. A fluid source is associated with the airframe along with means for hydraulically controlling the position of the flap about the axis and a hydraulic flap actuator operatively connected to the flap for changing the position of the flap with respect to the blade in response to a signal from the controlling means. A rigid tubular member formed in the shape of a helix having least about 2 revolutions and a non-constant pitch length is sealingly connected between the fluid source and the hydraulic flap actuator for transferring pressurized fluid between the fluid source and the flap actuator.

BRIEF DESCRIPTION OF DRAWINGS

For a more complete understanding of the present invention, reference should now be had to the embodiments shown in the accompanying drawings and described below. In the drawings.

DETAILED DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the Figures. Indeed, the components may be oriented in any direction and the terminology, therefore, should be understood as encompassing such variations unless specified otherwise.

The present invention is illustrated and described as it is contemplated for use in a hydraulic actuation system on a helicopter rotor blade for providing active control of the blade or one or more flaps on the blade. However, it should be understood that the present invention is not limited to such an embodiment. For example, the present invention can be used in hydraulic blade or flap pitch control systems in various types of rotating machines, devices and instrumentalities such as, for example, a fan blade, a propeller or airscrew on a propeller-driven airplane, a wind turbine, or a screw propeller on a watercraft and the like.

Figure 1:
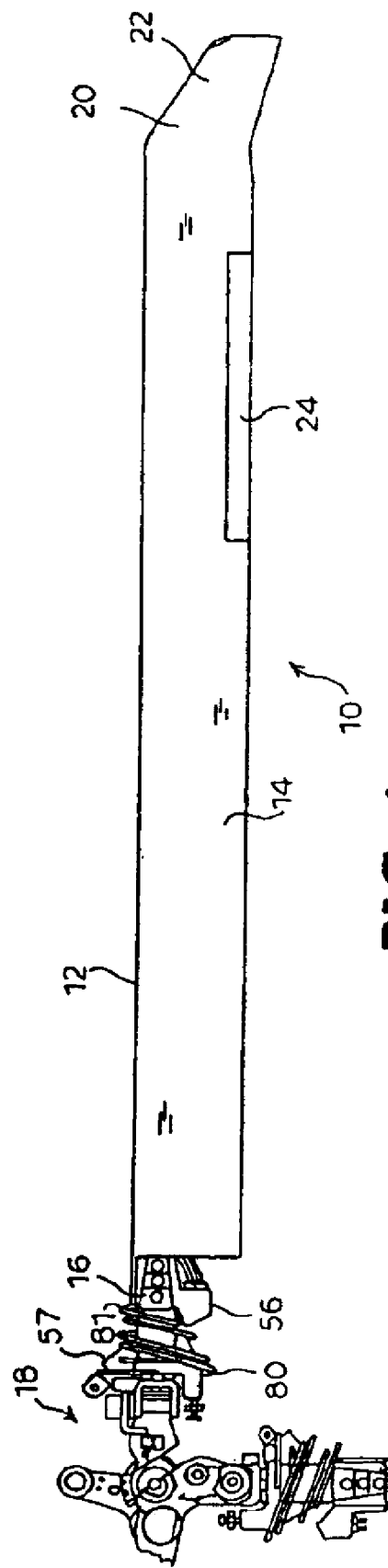
FIG. 1 is a plan view of a helicopter rotor blade incorporating an actuatable flap.

Referring now to the drawings, wherein like reference numerals illustrate corresponding or similar elements throughout the several views, FIG. 1 illustrates a rotor blade 10 for a helicopter (not shown). The rotor blade 10 includes a leading edge 12 and a trailing edge 14. The blade 10 is attached at a root end 16 to a rotor hub 18 mounted on a rotating shaft. The shaft is driven by an engine and a transmission (not shown). The blade 10 includes a tip end 20 which is located at the radially outermost point of the blade 10. The tip end 20 may include a tip cap 22. The rotor blade 10 is rotated in conjunction with the shaft and hub 18 about a rotational axis. The rotor blade 10 may be individually pivotable about a feathering axis to control the aircraft flight.

The blade 10 may also include at least one actuatable flap assembly 24 mounted to the trailing edge 14 of the blade 10 so as to be articulatable with respect to the trailing edge 14. For purposes of illustration of the present invention, only one actuatable flap assembly 24 is shown located within a recess in the trailing edge 14 of the blade 10. However, it is understood that the flap 24 may be located on the leading edge 12 or aft of the trailing edge 14 and extend all or partway along the length of the edge of the blade 10.

Moreover, there may be several flaps 24 mounted on the rotor blade 10 all of which may be articulated either independently or concurrently.

Figure 2:
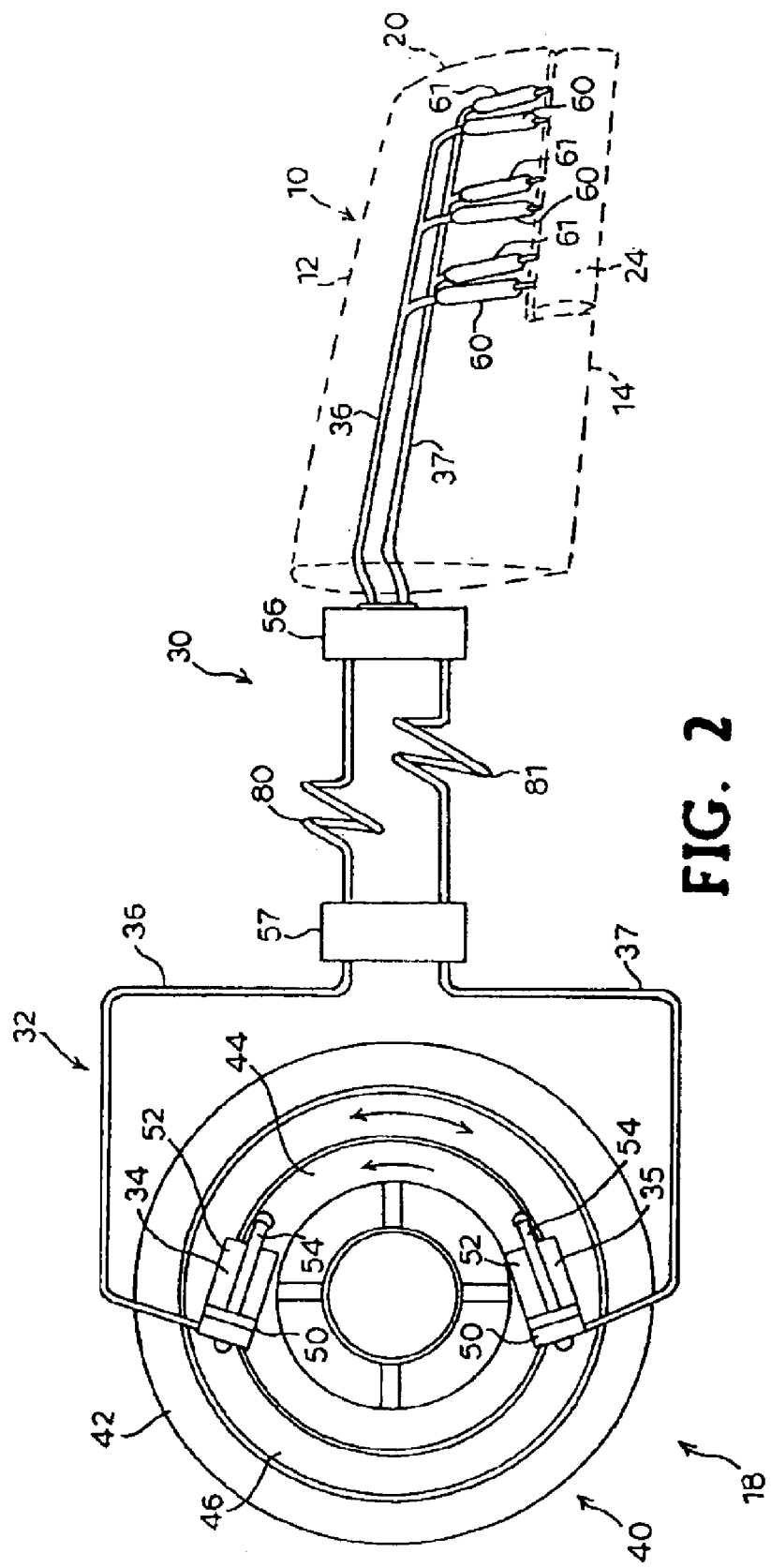
FIG. 2 is a schematic representation of one embodiment of a hydraulic actuation system for actuating a flap on a rotor blade shown in phantom to illustrate the actuation system.

A hydraulic actuation system 30 for controlling the rotation of the rotor blade flap 24 is shown schematically in FIG. 2. The actuation system 30 includes a fluid supply system 32 located within the rotor hub 18 and which generates pressurized fluid via fluid actuators 34, 35 operatively connected to the flap 24 via fluid supply lines 36, 37, respectively. The fluid supply system 32 is connected through an electrical control line (not shown) to a power source or a controller (not shown) for regulating the supply of fluid from the hub actuators 34, 35. The power source and controller can be located within the rotor hub or aircraft, with the power and control commands being transferred from the aircraft to the rotor hub 18 through any conventional means, such as a slip ring connection. Generally, the controller controls the operation of the fluid supply system 32 so as to generate the desired rotor blade 10 or flap 24 rotations at the appropriate angular positions of the blade relative to the aircraft's fixed airframe. A suitable hydraulic actuation system 30 is described in more detail in U.S. Pat. No. 6,200,096 entitled "Actuation System for an Active Rotor Control System", the contents of which are hereby incorporated by reference.

In the embodiment of the hydraulic actuation system 30 shown in FIG. 2, the fluid supply system 32 comprises a permanent magnet motor (PMM). The PMM is described in more detail in U.S. Pat. No. 6,476,534 entitled "Permanent Magnet Phase-Control Motor", the contents of which are hereby incorporated by reference. It is understood that while the illustrated embodiment is described as including a hub mounted fluid supply system 32, the scope of the present invention contemplates other fluid supply systems-which can be substituted therefor for controlling pressurization of the fluid lines.

The PMM includes a stationary support 42 mounted to the airframe of the aircraft and a rotating support 44 attached to the rotating shaft of the rotor hub 18. An intermediate ring 46 is disposed between the stationary support 42 and the rotating support 44. Each hub actuator 34, 35 includes a moveable member 50, such as a piston, which is slidably disposed within a housing 52. The actuator housings 52 are mounted to the intermediate ring 46. A piston rod 54 extends out of the end of the housings 52 and is rotatably attached by a pivot pin to the rotating support 44. Each piston 50 and housing 52 define a pressure chamber within the hub actuators 34, 35 which contains a fluid to be pressurized. Fluid supply lines 36, 37 connect the hub actuators 34, 35 to blade flap actuators 60, 61 for transferring the fluid medium between the two. The flap actuators 60, 61 are mounted within the rotor blade 10 and are located near and operatively engage the flap 24 so that actuation of the actuators 60, 61 causes the flap to move in a prescribed manner when pressurized fluid is conveyed through the supply lines 36, 37. In the embodiment shown in FIG. 2, one fluid supply line 36 provides fluid for actuating the flap 24 upward and the second supply line 37 provides fluid for actuating the flap 24 downward. Manifolds 56, 57 are provided on the rotor blade 10 and on the hub-mounted fluid supply system 32, respectively, for terminating the fluid supply lines 36, 37 at these locations. It is understood that many types of fluid-controlled flap actuators can be used in the present invention.

The PMM produces a change in hydraulic pressure within the hub actuators 34, 35 in order to transfer pressurized fluid along the supply lines 36, 37. More particularly, the PMM generates differential rotation of the intermediate ring 46 with respect to the rotating support 44 which displaces fluid to drive the actuation system 30 and thus change the pitch of the blade flap 24. For example, as seen in FIG. 2, differential rotation of the intermediate ring 46 with respect to the rotating support 44 in the clockwise direction will cause the pistons 50 within the hub actuators 34, 35 to slide within their respective housings 52. This movement results in the piston 50 of the upper actuator 34 being pushed deeper into the housing 52 of the actuator 34 thereby compressing and forcing hydraulic fluid to flow under pressure in the associated fluid supply line 36. Simultaneously, the piston 50 in the lower actuator 35, as seen in FIG. 2, is partially withdrawn from the housing 52 of the actuator 35 in decompression thereby allowing space to accommodate the flow of hydraulic fluid thus displaced out of the other fluid supply line 37. Thus, at the same time the first actuator 34 is pressurized, forcing fluid out of the fluid supply system 32 toward the flap actuators 60, the second actuator 35 is depressurized allowing fluid to flow out of the flap actuators 61 toward the fluid supply system 32. The differential pressure between the two fluid lines 36, 37 provides the flap 24 motion. When the intermediate ring 46 moves in the opposite direction with respect to the rotating support 44, the functioning of the pair of hydraulic actuators 34, 35 is exactly reversed to move the blade 10 or flap 24 in the opposite direction. Preferably, for each blade 10 of a multi-bladed rotary wing aircraft, a dedicated hydraulic actuation system 30 provides pressurized fluid medium separately to the actuators 60, 61. Since a PMM can be separately controlled, supply of pressurized fluid can be tailored to each blade 10 as needed.

While FIG. 2 shows one hub actuator 34, 35 attached to each fluid supply line 36, 37, it should be readily apparent that there may be more than one hub actuator pair depending on the fluid pressure and flow that is needed, load sharing requirements and space constraints. In most rotary wing aircraft applications there are preferably two actuators per fluid supply line to develop hydraulic force to push the blade 10 or flap 24 in one direction; and there are two more actuators to push the blade 10 or flap 24 in the opposite direction. The use of four actuators facilitates slimmer actuator diameters and offers better balancing of forces within the rotating PMM. Alternatively, the hub actuators can be double-acting to provide a push-pull control, within a single actuator housing, of the blade 10 or flap 24. As another alternative arrangement, with an appropriate biasing arrangement as part of the flap actuator of the associated blade 10 or flap 24, a single-acting hydraulic actuator and a single line would be sufficient.

Figure 3:
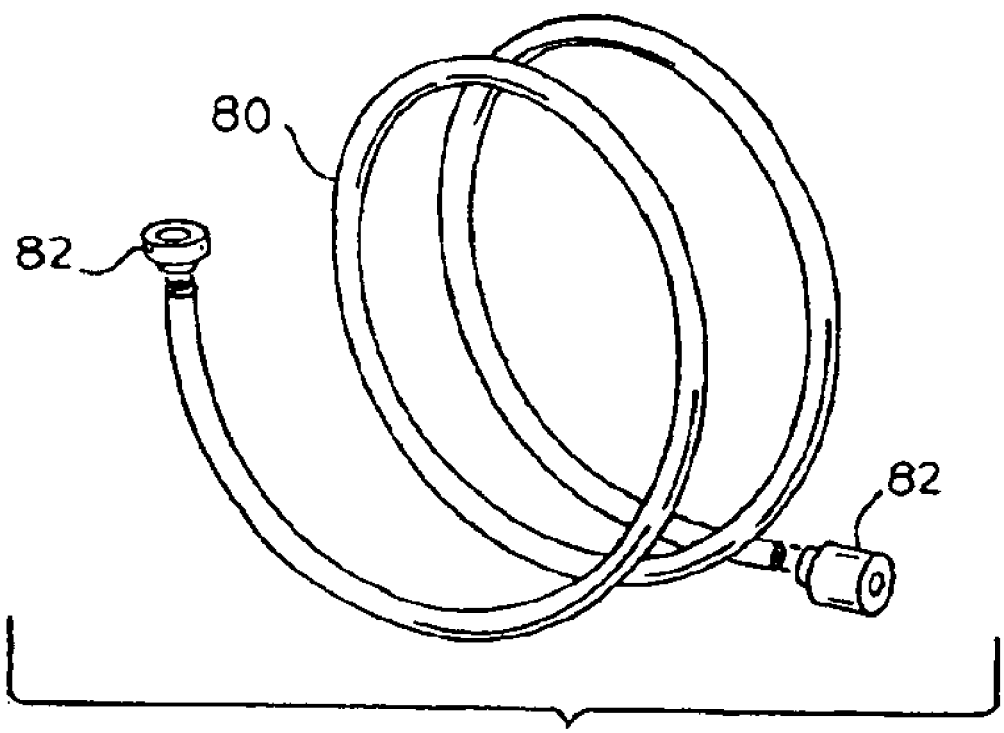
FIG. 3 is an exploded view a helical fluid conduit according to the present invention.

A portion of the fluid supply lines 36, 37 between the manifolds 56, 57 is helical. Referring to FIG. 3, there is shown this fluid supply conduit according to the present invention and generally designated at 80. The conduit 80 comprises a tubular member in the shape of a helix. The conduit 80 is preferably made of a formable, high strength material in order to withstand the combined effects of joint motion and centrifugal body forces due to rotation of the rotor hub 18 and blade 10. The tubing material should have sufficient wall stiffness so that the walls do not expand in response to pulses of high pressure working fluid. A suitable high strength material is metal, for example, heat treatable seamless steel tubing such as AISI 4130. Other formable high strength materials may be used for the fluid conduit in the present invention. For example, the fluid conduit may be made from copper, aluminum, low grade steel, or the like, if the material meets the stress requirements for the particular application.

The tubing 80 can be formed into a helical shape through any conventional means which results in the formation of the helix. Preferably, the walls of the tubing 80 are thin for accommodating the shaping of the tubing. For example, AISI steel tubing is about 0.035 inches thick with an outside diameter of about 0.188 inches. The tubing 80 is formed in the shape of a helix such that the cross-section of the tubing 80 remains substantially circular. The circular cross-section provides the highest wall stiffness in a minimum energy configuration. If the cross-section of the tubing 80 becomes elliptical during forming, pressurization of the tubing 80 would cause the wall to flex into a circular shape during use, thereby reducing the high wall stiffness. One method of maintaining a substantially circular cross-section during forming is by filling the tubing 80 with a low melting point lead before the forming operation. The tubing 80 is formed while the metal is in its annealed state. After forming, the tubing 80 is heated and the melted lead removed. The helical tubing 80 is then heat treated and tempered to a hardness of approximately Rc 40 to withstand the high body forces generated in rotating frame.

There are a number of tubing 80 parameters which can be considered or optimized as a function of the design space available in a particular application. The diameter of the tubing 80, the thickness of the walls of the tubing 80, the number of turns of the helix, and the pitch diameter and the pitch length of the helix are generally dependent on the particular application of the present invention. Expected fluid flow rates and pressure drop across the tubing 80 will determine the tubing diameter. In turn, the tubing 80 diameter and expected fluid operating pressure will determine the necessary wall thickness of the tubing 80.

The number of turns of the helix and the pitch diameter and pitch length are determined by the tolerance to the reaction force the tubing 80 imposes on the articulated member as it is moved relative to the non-articulated member in a particular application. Increasing the magnitude of any of these three helix parameters reduces the reaction force. The number of turns in the helical tubing 80 from end to end is preferably no less than about 2. However, in an application wherein the non-articulated member also rotates about another axis, such as in a helicopter wherein the non-articulated rotor blade 10 also rotates about the rotor hub 18, a trade-off exists between the extent to which the reaction force can be reduced and the ability of the tubing 80 to withstand stress induced in it's the tubing wall. The number of turns of the helix and the pitch diameter cannot be arbitrarily high because the helical tubing 80 is only supported at the ends and undergoes axial body forces during rotation about the rotor hub 18. An increased number of turns and pitch diameter leads to an increase in the mass of the helical tubing 80. The increased mass results in increased stresses in the tubing 80 wall and at the tubing ends as this mass must be supported against the centrifugal forces of rotation at the manifolds 56, 57. Therefore, the number of turns of the helix and the pitch diameter are chosen to ensure that the added force due to rotation, and to movement around the joint in all three rotations, remains low. Thus, the pitch diameter of the helix is also preferably no more than about 3.5 inches.

High stress can be addressed by selecting a tubing material capable of withstanding such stress. The stress can also be reduced to some extent by using a helix of non-constant pitch length, as seen in FIG. 3. The helical tubing 80 is installed so that the portion of the helix with the shorter pitch length is adjacent the rotating hub 18 placing a greater portion of the helix mass closer to the axis of rotation of the non-articulated member. As the hub 18 rotates, body forces cause the pitch to become roughly constant thus reducing stress within the tubing 80 wall.

Stress in the tubing 80 wall and at the tubing ends can be reduced by using an attachment method to the manifolds 56, 57 that does not cause stress concentrations. According to the present invention, a fluid-tight insert 82 (FIG. 3) is attached to the tubing 80 ends. The insert 82 has a gentle radius that allows the forces generated at the tubing 80 ends to be gently transitioned to the manifolds 56, 57. Attachment of the insert 82 to the tubing 80 ends is preferably accomplished by a brazing or soldering operation to preserve the mechanical structure of the tubing 80 walls. Where heat-treated tubing is used, a low temperature silver solder will preserve the metallurgic strength of the tubing material while contributing high joining strength. A solder composed of 96.5% tin and 3.5% silver with a melting point of 430 degrees F is an example.

Figure 4:
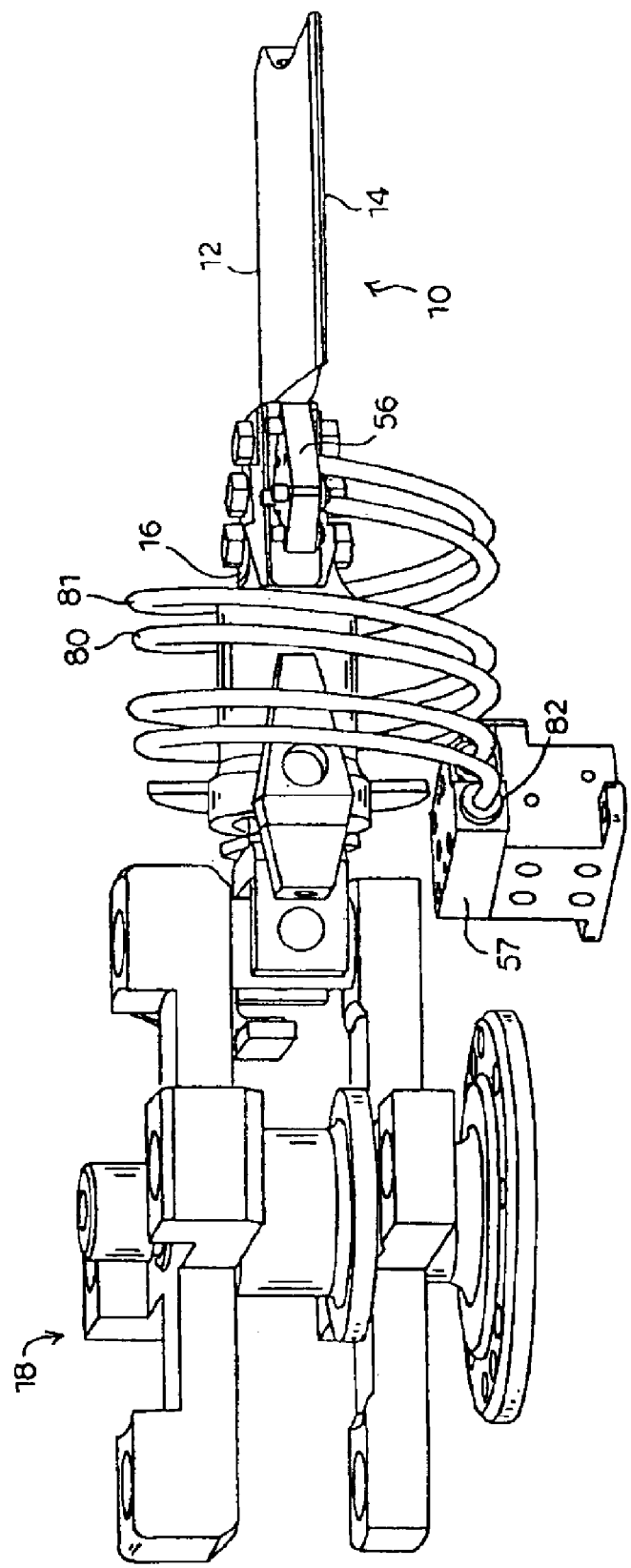
FIG. 4 is a side elevation view of an embodiment of a hydraulic actuation system including a helical fluid conduit according to the present invention.
Figure 5:
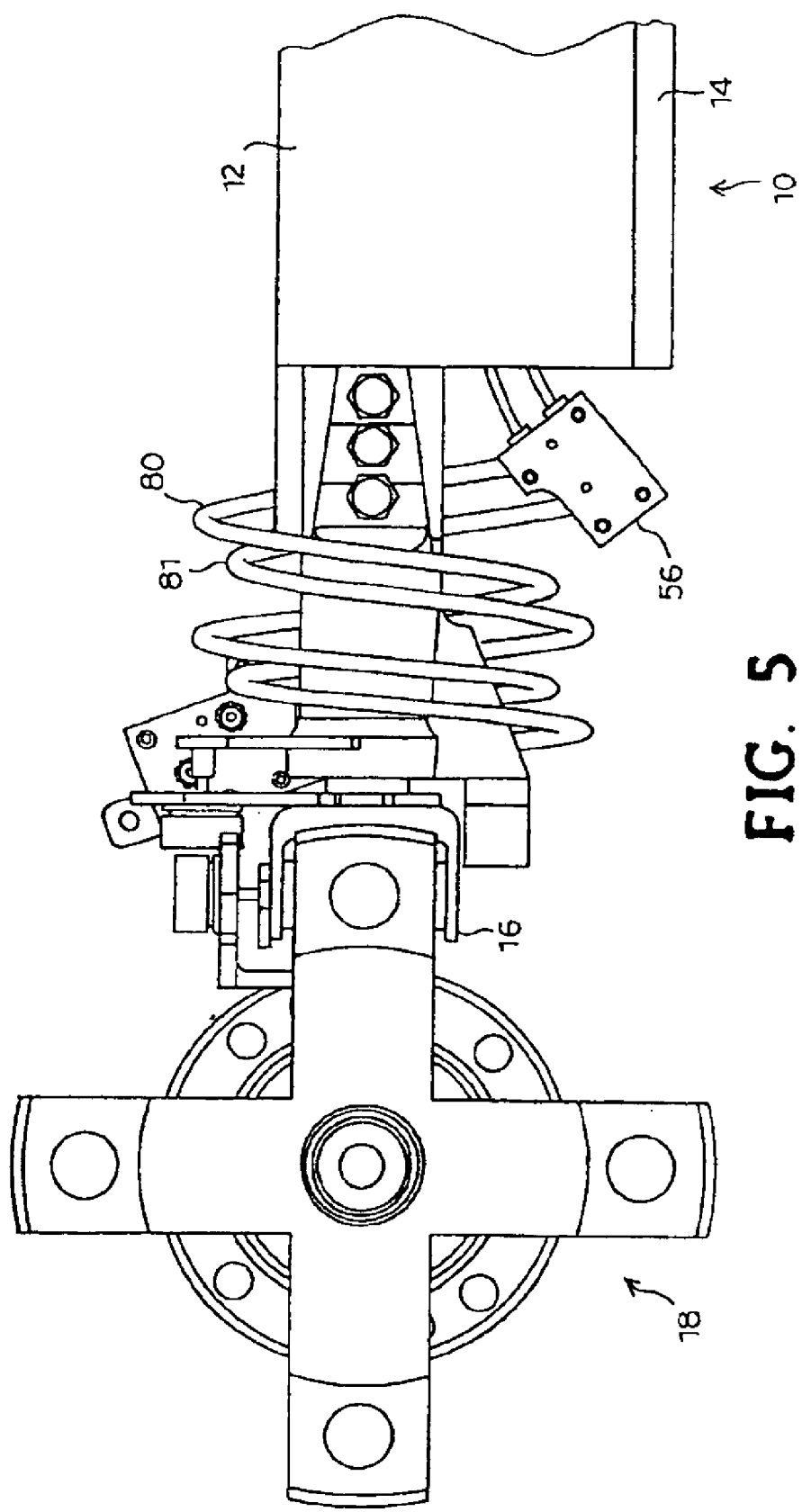
FIG. 5 is a plan view of the hydraulic actuation system shown in FIG. 4.
Figure 6:
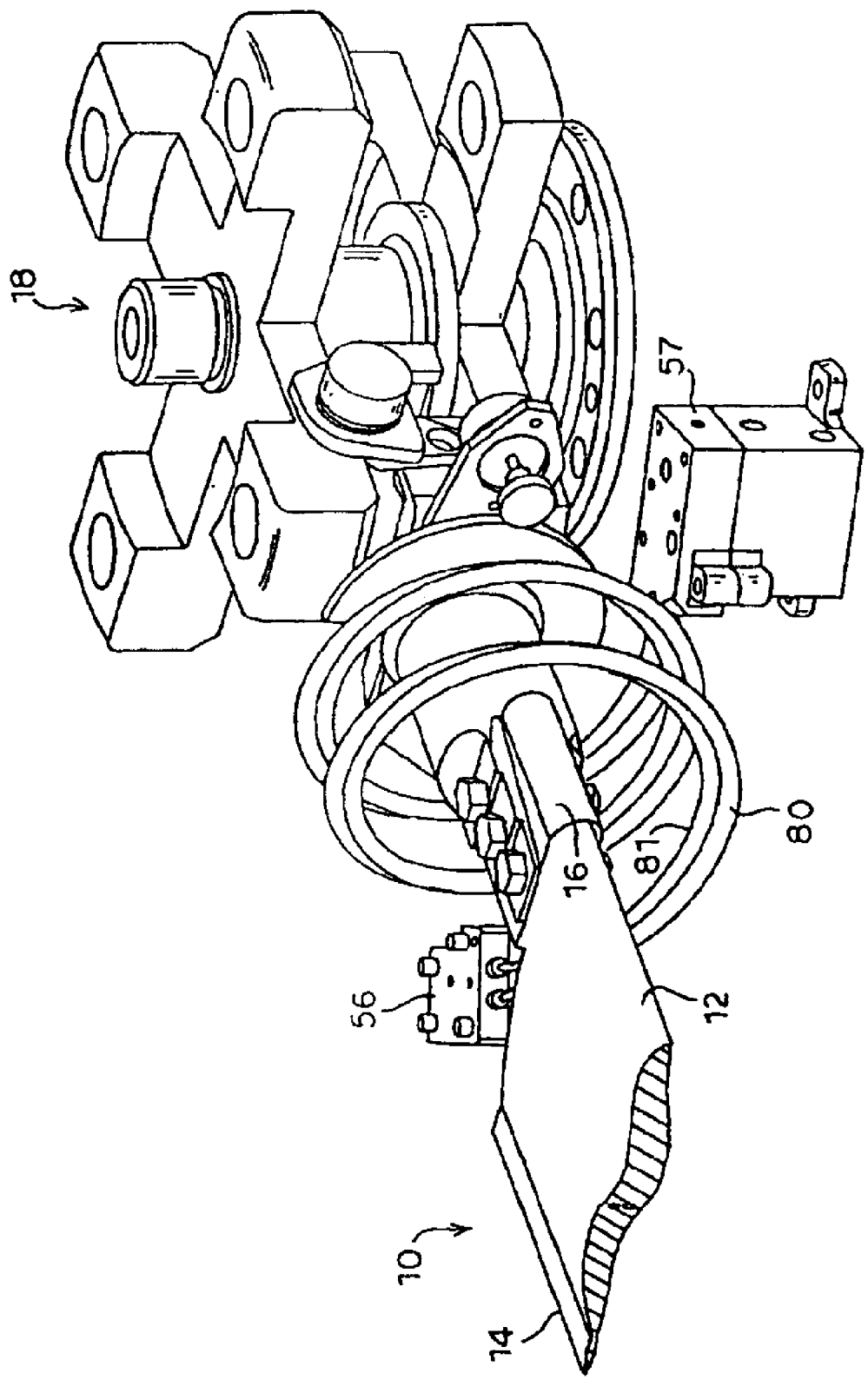
FIG. 6 is a perspective view of the hydraulic actuation system shown in FIG. 4.

As seen in FIGS. 4–6, the tubing 80 is connected between the manifolds 56, 57 for transferring fluid between the fluid supply system 32 and the portion of the actuation system 30 associated with the rotor blade 10. When two supply lines 36, 37 are employed, as shown in the FIGs., one tubing 80 is nested within the another tubing 81. Because the respective tubings 80, 81 are formed with different, non-constant pitch, adjacent coils of the nested helixes do not contact and rub against each other.

In use, the helical, stiff-walled fluid conduit 80 of the present invention delivers pressurized working fluid within a hydraulic actuation system 30 without loss of power or extended response time due to wall expansion. The flexibility to motion resulting from the helical shape of the fluid conduit 80 of the present invention renders the fluid conduit 80 suitable for use in a hydraulic actuation system for an articulated portion of a machine where the fluid conduit 80 spans the multi-degree of freedom joint between the non-articulated and articulated portions of the machine allowing for unrestrained movement at the joint. Moreover, the helical shape accommodates embodiments of the present invention wherein a plurality of tubes are used since the tubes, by varying their inside diameter or axial position, can be nested within one another.

The helical fluid conduit 80 of the present invention is connected between the fluid supply provided on the non-articulated frame of the machine, including one or more hydraulic motive devices, and an actuator on the rotating frame for delivery of fluid to the actuator for controlling an instrumentality. If the motive devices are located adjacent the drive shaft within, for example, the mast of a wind turbine, the airframe of an airplane or helicopter, or the engine room of a ship, the control of the motive devices can be advantageously coordinated with the rotational position of each blade. For example, in the PMM, as described above, the motive device has at least two parts, a rotor which rotates with the drive shaft and a stator which is mounted to and substantially stationary with the non-rotating part of the machine. A logic system is typically provided for controlling the operation of the motive device so as to generate the desired blade or flap movements at the appropriate angular positions of the blade about the drive shaft. Control signals are conducted to the motive device for transfer of hydraulic fluid between the motive device and the actuator on the rotating parts of the instrumentality along a hydraulic communication path. The fluid conduit 80 according to the present invention comprises the portion of the communication path between the non-rotating portion of the instrumentality and the rotating parts. The fluid conduit of the present invention provides the hydraulic actuation system the advantage of fluid delivery to the articulating portion of the machine with sufficient power and response time to perform in such extreme environments as actuation of a rotor blade or blade flap in rotary wing aircraft.

Although the present invention has been shown and described in considerable detail with respect to only a particular exemplary embodiment thereof, it should be understood by those skilled in the art that I do not intend to limit the invention to the embodiment since various modifications, omissions and additions may be made to the disclosed embodiment without materially departing from the novel teachings and advantages of the invention, particularly in light of the foregoing teachings. For example, the fluid conduit is shown for use with a rotating blade, but can be used as a part of hydraulic control of an articulated part of any instrumentality, device or machine. Accordingly, I intend to cover all such modifications, omissions, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a crew may be equivalent structures.

What is claimed is:

1. A fluid line for use in an active control device on a rotary wing aircraft having an airframe and a rotor rotatable relative to the airframe, the rotor including a hub and at least one elongated rotor blade connected at one end to the hub and extending radially outwardly therefrom such that when the rotor hub is rotatably driven the rotor blade rotates with the hub, the rotor blade movable relative to the hub about a blade pitch axis extending along its length, and a hydraulic actuation system for moving the blade about the blade pitch axis including a fluid source associated with the hub, means for controlling the position of the rotor blade about the blade pitch axis, and a hydraulic actuator operatively connected to and rotating with the blade for changing the position of the blade about the blade pitch axis in response to a signal from the controlling means, the fluid line comprising:

a rigid member having a substantially helical shape with at least about two revolutions and a non-constant pitch length, said rigid member having a first end and a second end;

a first fluid-tight connector fluidly connecting said first end of said rigid member to the fluid source; and a second fluid-tight connector fluidly connecting said second end of said rigid member to the hydraulic actuation system;

wherein said first and second connectors are structured and arranged to non-releasably transmit forces generated in said rigid member to the hub and the rotor.

2. A fluid line as recited in claim 1, wherein the tubular member is formed from a material having a hardness of about Rc 40.

3. A fluid line as recited in claim 1, wherein the tubular member has a pitch diameter of less than about 3.5 inches.

4. A fluid line as recited in claim 1, further comprising a second rigid tubular member formed in the shape of a helix having at least about 2 revolutions and a non-constant pitch length, the ends of the tube adapted to be connected between the fluid source and the actuator so that the second rigid tubular member is nested within the first tubular member.

5. A fluid line for use in an active control device on a rotary wing aircraft having an airframe and a rotor rotatable relative to the airframe, the rotor including a hub and at least one elongated rotor blade connected at one end to the hub and extending radially outwardly therefrom such that when the rotor hub is rotatably driven the rotor blade rotates with the hub, the rotor blade comprising a flap attached to and movable relative to the blade about an axis, and a hydraulic actuation system or moving the flap about the axis, the hydraulic actuation system including a fluid source associated with the hub, means for controlling the position of the flap about the axis, and a hydraulic flap actuator operatively connected to the flap for changing the position of the flap with respect to the blade in response to a signal from the controlling means, the fluid line comprising:

a rigid member having a substantially helical shape with at least about two revolutions and a non-constant pitch length, said rigid member having a first end and a second end:

a first fluid-tight connector fluidly connecting said first end of said rigid member to the fluid source; and a second fluid-tight connector fluidly connecting said second end of said rigid member to the hydraulic actuation system:

wherein said first and second connectors are structured and arranged to non-releasably transmit forces generated in said rigid member to the hub and the rotor.

6. A fluid line as recited in claim 5, wherein the tubular member is formed from a material having a hardness of about Rc 40.

7. A fluid line as recited in claim 5, wherein the tubular member has a pitch diameter of less than about 3.5 inches.

8. A fluid line as recited in claim 5, further comprising a second rigid tubular member formed in the shape of a helix having at least about 2 revolutions and a non-constant pitch length, the end of the tube adapted to be connected between the fluid source and the actuator so that the second rigid tubular member is nested within the first tubular member.

9. An active control device for hydraulically controlling the position of a rotor blade flap on a rotary wing aircraft having an airframe and a rotor rotatable relative to the airframe, the rotor including a hub and at least one elongated rotor blade connected at one end to the hub and extending radially outwardly therefrom such that when the rotor hub is rotatably driven the rotor blade rotates with the hub, the rotor blade flap movably attached to and movable relative to the blade about an axis, the active control device comprising:

a fluid source adapted to be mounted to the airframe;

means for controlling the position of the flap about the axis;

a hydraulic flap actuator adapted to be operatively connected to the flap for changing the position of the flap with respect to the blade in response a signal from the controlling means; and a rigid member having a substantially helical shape with at least about two revolutions and a non-constant pitch length, said rigid member having a first end and a second end;

a first fluid-tight connector fluidly connecting said first end of said rigid member to said fluid source; and a second fluid-tight connector fluidly connecting said second end of said rigid member to the hydraulic flap actuator;

wherein said first and second connectors are structured and arranged to non-releasably transmit forces generated in said rigid member to the hub and the rotor blade.

10. A rotary wing aircraft, comprising:

an airframe;

a rotor rotatable relative to the airframe including a hub, and at least one elongated rotor blade connected at one end to the hub and extending radially outwardly therefrom such that when the rotor hub is rotatably driven the rotor blade rotates with the hub, the rotor blade comprising a flap attached to and movable relative to the blade about an axis;

a fluid source associated with the airframe;

means for hydraulically controlling the position of the flap about the axis;

a hydraulic flap actuator operatively connected to the flap for banging the position of the flap with respect to the blade in response to a signal from the controlling means; and a rigid member having a substantially helical shape with at least about two revolutions and a non-constant pitch length, said rigid member having a first end and a second end;

a first fluid-tight connector fluidly connecting said first end of said rigid member to the fluid source; and a second fluid-tight connector fluidly connecting said second end of said rigid member to the controlling means;

wherein said first and second connectors are structured and arranged to non-releasably transmit forces generated in said rigid member to the hub and the rotor blade.

* * * * *